(12) United States Patent
Schumacher

(10) Patent No.: US 10,225,167 B2
(45) Date of Patent: Mar. 5, 2019

(54) METHOD AND SYSTEM FOR DETERMINING PAGE IMPRESSION IN A CLIENT-SERVER SYSTEM

(71) Applicant: Meetrics GmbH, Berlin (DE)

(72) Inventor: Hendrik Schumacher, Berlin (DE)

(73) Assignee: MEETRICS GMBH, Berlin (DE)

( * ) Notice: Subject to any disclaimer, the term of this patent is extended or adjusted under 35 U.S.C. 154(b) by 146 days.

(21) Appl. No.: 14/917,415

(22) PCT Filed: Sep. 10, 2014

(86) PCT No.: PCT/EP2014/069307
§ 371 (c)(1),
(2) Date: Mar. 8, 2016

(87) PCT Pub. No.: WO2015/036439
PCT Pub. Date: Mar. 19, 2015

(65) Prior Publication Data
US 2016/0226730 A1    Aug. 4, 2016

(30) Foreign Application Priority Data

Sep. 10, 2013  (EP) .................................. 13183691

(51) Int. Cl.
*G06F 15/173* (2006.01)
*H04L 12/26* (2006.01)
*G06Q 10/00* (2012.01)

(52) U.S. Cl.
CPC .......... *H04L 43/062* (2013.01); *G06Q 10/00* (2013.01)

(58) Field of Classification Search
CPC .............................. H04L 43/062; G06Q 10/00

USPC ........................................................ 709/204
See application file for complete search history.

(56) References Cited

U.S. PATENT DOCUMENTS

| 2005/0166138 | A1 | 7/2005 | Kundu | |
| 2012/0203592 | A1* | 8/2012 | Ravindran | G06Q 30/0204 705/7.29 |
| 2013/0304906 | A1* | 11/2013 | Yavilevich | H04L 67/22 709/224 |
| 2015/0317643 | A1* | 11/2015 | Mian | H04L 9/3247 705/317 |

* cited by examiner

*Primary Examiner* — Alan S Chou
(74) *Attorney, Agent, or Firm* — Harness, Dickey & Pierce, P.L.C.

(57) ABSTRACT

The application relates to a method for determining page impression in a client-server system, the method comprising opening a page in a browser running on a client device provided in the client-server system, starting an application in the browser in response to the opening of the webpage, establishing a persistent connection between the web browser on the client device and a server device provided in the client-server system, storing first electronic information in the server device, the first information indicating a start time for establishing the persistent connection, keeping the persistent connection, in the server device, receiving termination information indicating termination of the persistent connection, storing second electronic information in the server device, the second information indicating an end time for terminating the persistent connection, and determining an opening or presentation time from the first and second electronic information, the opening or presentation time indicating the time between opening and terminating of the page in the browser.

9 Claims, 1 Drawing Sheet

METHOD AND SYSTEM FOR DETERMINING PAGE IMPRESSION IN A CLIENT-SERVER SYSTEM

CROSS-REFERENCE TO RELATED APPLICATIONS

Figure 1:
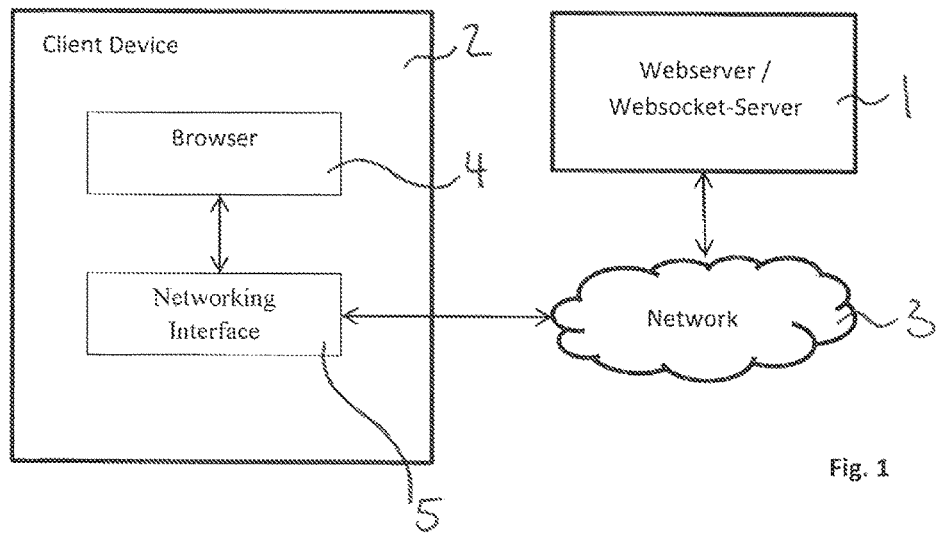

This application is a national phase of PCT/EP2014/069307, filed Sep. 10, 2014 which claims priority to European Serial No. 13183691.8 filed Sep. 10, 2013. The entire disclosures of the above applications are incorporated herein by reference.

The present disclosure refers to technology in the field of page presentation (page impression) on a client device in a computer network system. In a typical embodiment, the present disclosure refers to determining how long a user stays on a page, for example, a webpage.

BACKGROUND

A user visiting webpages in the internet usually uses a browser on his computer. When he visits a webpage the browser retrieves files from a webserver and renders the webpage on the users screen. For the party providing the webpage it is usually of interest which pages the user visited and how long the webpage was open in the user's browser. The duration of the page impression is important information because it will tell the webpage provider how the user used the webpage (optionally along with further information also gathered). Thus the duration of the page impression is especially important in web analytics applications.

Subsequently the visit of a single user to a single webpage will be called a "page impression". The information which webpages the user visited can easily be extracted from logs on the webserver that keep track of who retrieved which files from the server. The duration of the page impression cannot be determined this way because the browser will usually no longer retrieve any files from the webserver after the webpage has been fully loaded.

Systems and methods for visually displaying click-through, impression pertaining to webpages are disclosed in U.S. 2005/0166138 A1.

There are different ways to determine the duration of the page impression:
1) The webserver logs may contain information that helps to identify the user (ie to distinguish him from other users). By checking when this unique user opens the next webpage it is possible to determine when the previous page impression ended. This approach has severe limitations though as it would not get a duration value (a) when the user just closed the browser or the webpage or (b) the user went to another webpage that is retrieved from a different webserver. This approach would return a wrong duration if (c) the user went to another webpage but kept the original webpage opened.
2) It is possible to execute a script on the user's browser that sends data to the webserver in certain time intervals (this approach is commonly called "pinging"). This approach works in most circumstances but (a) returns only a rough estimation of the duration of the page impression and (b) puts a huge load on the webserver that receives the data. The accuracy of the data gathered this way depends on the length of the time interval. The shorter the time interval the more accurate the data, but the higher the load on the server.
3) A more sophisticated approach is to send data to the webserver only when the user leaves the webpage. It is possible to tell the browser to execute certain operations when the webpage is "unloaded" from the browser. This approach worked very well for a long time since it returns accurate data and does only one additional request on the server. Lately there have been changes to the different available browsers that make this approach less reliable. Since it is not really intended that a webpage the user is just closing executes a lot of operations and sends data to a webserver and since executing this code hurts the performance of the browser (by delaying the opening of the next page) many browsers have put in limitations on what operations can be executed in the event of an "unload". Due to these limitations there is a certain possibility that the webpage will not return any data when it is closed. The reliability of this approach is constantly decreasing in the ongoing development of the available browsers.

Since method 3) will soon no longer be usable if data reliability and integrity is of any concern only the pinging solution according to method 2) will be available.

SUMMARY

It is an object of the present disclosure to provide technologies for determining page impression in a client-server system which offer improved data reliability along with the accuracy and network efficiency.

According to an aspect of the present disclosure, a method for determining page impression in a client-server system is provided. In an embodiment, the method is comprising the following steps: opening a page, e.g. webpage, in a browser running on a client device provided in the client-server system; starting an application in the browser in response to the opening of the page; establishing a persistent connection between the browser on the client device and a server device provided in the client-server system; storing first electronic information in the server device, the first information indicating a start time for establishing the persistent connection; keeping the persistent connection; in the server device, receiving termination information indicating termination of the persistent connection; storing second electronic information in the server, the second information indicating an end time for terminating closing the persistent connection; and determining an opening or presentation time from the first and second electronic information, the opening or presentation time indicating the time between opening and terminating of the page in the browser.

According to another aspect, a client-server system is provided, the system comprising a computing-based device adapted to perform a method for determining page impression.

The first information may be indicating receiving a first data package sent from the browser to the server device over the persistent connection.

The method may further comprise receiving the first data package with an initial time offset after the persistent connection was opened. The first data package is sent after the persistent connection has been opened.

The method may further comprise a step of assigning a unique identifier to the page by the application in the browser and sending identifier information indicating the unique identifier from the browser to the server device over the persistent connection.

In another embodiment, the method may comprise detecting a connection error for the persistent connection in the client device, re-establishing the persistent connection by using the information about the unique identifier, and resuming the determining of the opening or presentation time. Thereby, the process of for determining page impression is resumed.

In an embodiment, the method may comprise sending the identifier information by the first data package sent from the browser to the server device over the persistent connection.

The may comprise indicating, by the termination information, termination of the persistent connection in response to closing the page in the browser. The termination information may be provided according to a standard format defined in the protocol used for establishing the persistent connection.

The method may further comprise indicating, by the termination information, termination of the persistent connection in response to a non-browser related event. Specifically, termination by such non-browser related event is not caused by closing the page in the browser, but, for example, may be due to any other interruption or termination of the persistent connection, e.g. because of physically disconnecting cables, connectors or devices providing for the persistent connection before. In another case, on online connection may be interrupted because of some temporary software related failure or error. Such non-browser related event, in many cases, may cause termination or closing of the page presentation in the browser, and, therefore, may provide an indication of page closing.

The browser may be referred to as web browser, especially in case of retrieving a web page.

In a possible embodiment of the present disclosure, it is proposed to open a persistent connection to the server when the webpage is loaded into the user's client (browser) and detecting when the persistent connection is closed. The persistent connection may be provided by using the so-called WebSocket web technology. In another embodiment the persistent connection may be provided by other technologies like the SPDY protocol developed by Google, socket connections created through third-party add-ons like the Adobe Flash browser plugin or a Java applet, or by using other means supported by an important share of the available web browsers.

Also, a persistent connection may be provided by using standard webserver protocol. A standard webserver connection may be used as a persistent connection in another embodiment of the present disclosure by employing techniques like long polling (i.e. holding a standard webserver connection open by delaying the response to the client), setting connection timeouts to a very high value and detecting a closed connection in the application.

For the purpose of the present disclosure, in a typical embodiment, a persistent connection is a connection for bi-directional or unidirectional data exchange (e.g. exchange of messages) established without pre-defined time limit and configured for being open for multiple message exchange. However, there is no need for actual exchange of messages between the browser and the server connected by the persistent connection after the webpage was opened (starting webpage presentation in the browser). Rather, only electronic information as to the opening and the closing of the persistent connection is to be gathered on the server side, such opening and closing of the persistent connection being caused by or linked to the opening and closing of the webpage in the browser of the client.

In a typical embodiment the present disclosure uses the so-called WebSocket web technology (e.g. according to the RFC 6455 of the Internet Engineering Task Force (IETF), Fette & Melnikov, December 2011). The WebSocket protocol provides for full-duplex communication. WebSocket extends the TCP protocol in that it enables a stream of messages instead of a stream of bytes. In contrast to a HTTP connection a WebSocket connection is designed to provide a data stream instead of stateless requests and responses. The WebSocket specification developed as part of the HTML5 initiative introduced the WebSocket JavaScript interface, which defines a full-duplex single socket connection over which messages can be sent between client and server. The WebSocket standard simplifies much of the complexity around bi-directional web communication and connection management.

WebSocket is an advanced technology that makes it possible to open an interactive communication session between the user's browser and a server. With this API, you can send messages to a server and receive event-driven responses without having to poll the server for a reply.

WebSocket allows opening a connection using the TCP protocol to a webserver. WebSocket as used in the present disclosure is especially useful for web analytics since there are no cross-domain limitations so the web socket connection can be opened to any server, not just the webserver the visited webpage is retrieved from (in contrast to that an AJAX request initiated by JavaScript can only be opened to a server running on the same domain as the webserver the current webpage was retrieved from). Furthermore it is very easy to open a WebSocket connection since the most important browsers have WebSocket support built into their current versions.

The present disclosure especially makes use of characteristics of the persistent connection, e.g. implemented by a WebSocket connection, in that it may use provisions made by the protocol regarding the persistence of the connection and the tracking of its state (pings, timeouts, error recovery) to getting correct information about the closing of the connection in all cases. Therefore, it is not necessary to track the state of the connection in the application, apply timeouts etc. It may be sufficient to wait for the underlying protocol to inform the application about the closed connection.

In a typical embodiment of the present disclosure a method comprises one or more of the following steps:

When the user opens a webpage an application is executed in the user's browser, typically using the common JavaScript scripting language.

The application opens a WebSocket connection to a pre-determined server (for example in JavaScript by instantiated a new WebSocket object). Optionally a unique number that can be used as an identifier of the current page impression is transferred (for example in JavaScript by calling the send( )method on the instantiated WebSocket object).

The unique number may be used for re-establishing the WebSocket connection on the client side on connection error to resume measuring the duration of the same page impression (without the unique identifier the second connection would be measured as another page impression). To resume measuring the same page impression the client establishes another persistent connection and sends the same unique number to the server. The server can then update information on the server to mark the page impression as still ongoing.

The WebSocket connection may stay open as long as no error occurs, and it is not explicitly closed. Since there is no need to send any data the open connection puts no burden on the network connection (which is especially important for mobile devices).

When the user leaves the webpage the WebSocket is closed. The server detects this and measures the duration of the page impression by computing the difference between the time when the WebSocket connection was established and the time the WebSocket connection was closed. Closing the WebSocket either works explicitly by calling the close( ) method on the WebSocket object or implicitly by the WebSocket object being destroyed (for example when the webpage unloads). The implicit closing of the WebSocket is an important aspect of the method disclosed here as the WebSocket will be closed by the client's network architecture or the server's network interface if an error occurred on the client or the network or if the client suddenly lost connectivity.

DESCRIPTION OF EMBODIMENTS

Figure 2:
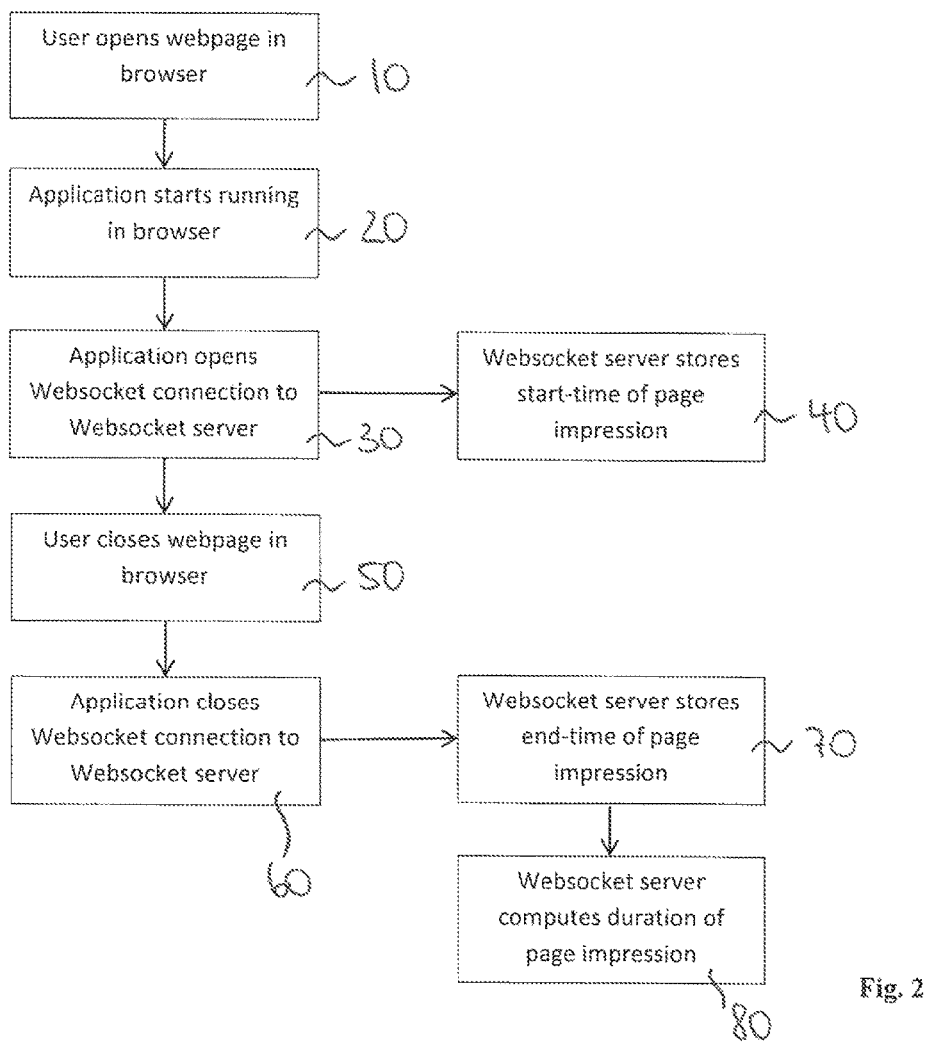

In the following, different embodiments are described. In the figures,

FIG. 1 shows a schematic representation of a client server network system, comprising a web server connected to a client device via a network architecture, and FIG. 2 shows a schematic representation of a block diagram for explaining steps of a method for determining time of opening for a webpage (page impression) in a browser of a client device.

FIG. 1 shows a schematic representation of a client-server-network system, comprising a web server 1 connected to a client device 2 via a network architecture 3 which may comprises wireless and/or wired connections for data transmission. On the client device 2, e.g. a user PC, user laptop or some other mobile user device such as mobile phone, a browser application 4 is implemented. The browser application 4 which may be provided by a standard browser application like Mozilla Firefox, Microsoft Internet Explorer, etc., is connected to a networking interface 5 for bi-directional data communication.

The term "web server" refers to a likely scenario for implementation, namely, where tracked webpages reside on the World Wide Web. The tracked webpages may also reside on networks other than the World Wide Web, however. In a non-World Wide Web context, the web server device 1 could be appropriately referred to as a "local area network server" or simply a "server." The web server may also be referred to as an Application Service Provider ("ASP") because it provides an application for end users (i.e., users of the client computer). In case of networks other than the World Wide Web, there may an application on the client device which also may be referred to as "browser", such browser being adapted to retrieve or download pages provided in the client-server-network system. In other embodiments there may be an application running on the client device, e.g. a mobile app running on mobile devices, which also may be referred to as "browser". In case of such client application a persistent connection using the raw TCP protocol may be used.

FIG. 2 shows a schematic representation of a block diagram for explaining steps of a method for determining time of opening for a webpage (page impression) in the browser 4 of the client device 2. If the user opens a webpage in the browser 4 (step 10), an application is started in the browser 4 (step 20). In a typical embodiment this application is implemented in JavaScript and is designed to collect some data about the webpage impression or presentation, e.g. the address of the webpage and/or the type of the client's browser, once it is started.

The running application opens a WebSocket connection to the server 1 provided with a WebSocket server (step 30). The server 1 is storing electronic information (for example a timestamp representing the number of milliseconds elapsed since a pre-defined epoch when the WebSocket connection was opened—time offset) about a start-time indicating the time when the WebSocket connection was opened/started (step 40). The start-time is indicating the time when the webpage is opened in the browser 4. The WebSocket connection is first opened. Following, delayed by the time offset, a first data package sent by the browser 4 is received by the server 1.

The information about the time offset sent in the first data package may specify the amount of time that has elapsed since the start of the page impression was detected by the client application until the first data package is sent by the application in the browser 4 to the server 1. Thus any time elapsed until the persistent connection was ready can be corrected in the server-side computation of the whole duration of the page impression.

The WebSocket connection between the web browser 4/the application running in the web browser 4 is kept until the user closes the webpage in the browser (step 50). In response to closing the webpage, the application running in the browser 4 is closing the WebSocket connection (step 60). Even if the application does not close the WebSocket connection explicitly the connection will be closed implicitly by the client's network interface or the server's network interface (providing for cases of errors or connectivity loss). In response to the closing of the WebSocket connection the server 1 is storing electronic information on the time of closing (step 70) which indicates the time of closing the webpage in the browser 4. From the electronic information about the time of opening the WebSocket connection and the time of closing the WebSocket connection the duration of webpage opening in the browser 4 is derived by computing the electronic information on the time difference (step 80). Such computing may be done in the server 1. The electronic information on the webpage presentation (page impression) may be provided to the client device and/or other devices connected to the network architecture 3.

On the server 1 the WebSocket connection is handled by a WebSocket application server. This application server can be provided by the same application that is providing the HTTP webserver or a different application. For ease of setup both types of connections should be handled by the same server. Since there will typically be a huge number of open WebSocket connections the application server should provide for a lot of connections. Typically it will be beneficial if the application server uses an asynchronous way to handle connections. One possible application to use for this type of setup would be a nginx webserver handling the WebServer connections in a LUA (programming language) script that stores page impression data in a Redis database.

The aspects of the present disclosure can be combined with one or more of the methods identified above and known as such, e.g. the pinging solution, by deciding which one to use based on the capabilities of the user's browser. Data sent in either way can be synchronized by transferring a unique number that is identifying the current page impression.

The features disclosed in this specification, and the figures may be material for the realization of the disclosure in its various embodiments, taken in isolation or in various combinations thereof.

The invention claimed is:

1. A method for determining page impression in a client-server system, the method comprising:

opening a page in a browser running on a client device provided in the client-server system, starting an application in the browser in response to the opening of the webpage, establishing a persistent connection between the web browser on the client device and a server device provided in the client-server system, storing first electronic information in the server device in response to establishing the persistent connection, the first information indicating a start time for establishing the persistent connection, keeping the persistent connection, in the server device, receiving termination information indicating termination of the persistent connection, storing second electronic information in the server device in response to receiving termination information, the second information indicating an end time for terminating the persistent connection, and determining an opening or presentation time from the first and second electronic information, the opening or presentation time indicating the time between opening and terminating of the page in the browser.

2. Method according to claim 1, wherein the first information is indicating receiving a first data package sent from the browser to the server device over the persistent connection.

3. Method according to claim 2, further comprising receiving the first data package with an initial time offset after the persistent connection was opened.

4. Method according to claim 1, further comprising assigning a unique identifier to the page by the application in the browser and sending identifier information indicating the unique identifier from the browser to the server device over the persistent connection.

5. Method according to claim 2 further comprising sending an identifier information by the first data package sent from the browser to the server device over the persistent connection.

6. Method according to claim 4 further comprising comprise detecting a connection error for the persistent connection in the client device, re-establishing the persistent connection by using the information about the unique identifier, and resuming the determining of the opening or presentation time.

7. Method according to claim 1, further comprising indicating, by the termination information, termination of the persistent connection in response to closing the page in the browser.

8. Method according to claim 1, further comprising indicating, by the termination information, termination of the persistent connection in response to a non-browser related event.

9. A client-server system, comprising a client device and a server device adapted to perform a method for determining page impression, the method comprising:

opening a page in a browser running on a client device provided in the client-server system, starting an application in the browser in response to the opening of the webpage, establishing a persistent connection between the web browser on the client device and a server device provided in the client-server system, storing first electronic information in the server device in response to establishing the persistent connection, the first information indicating a start time for establishing the persistent connection, keeping the persistent connection, in the server device, receiving termination information indicating termination of the persistent connection, storing second electronic information in the server device in response to receiving termination information, the second information indicating an end time for terminating the persistent connection, and determining an opening or presentation time from the first and second electronic information, the opening or presentation time indicating the time between opening and terminating of the page in the browser.

* * * * *